US012053772B2

(12) United States Patent
Cronin et al.

(10) Patent No.: US 12,053,772 B2
(45) Date of Patent: Aug. 6, 2024

(54) ANALYTICAL DEVICE AND METHODS OF USE

(71) Applicant: DEEPMATTER LTD., Glasgow (GB)

(72) Inventors: Leroy Cronin, Glasgow (GB); Laurence Ede, Glasgow (GB); Stephen Coles, Bude (GB); Mark Warne, Glasgow (GB); Richard Laming, Edinburgh (GB)

(73) Assignee: DEEPMATTER LTD, Glasgow (GB)

( * ) Notice: Subject to any disclaimer, the term of this patent is extended or adjusted under 35 U.S.C. 154(b) by 193 days.

(21) Appl. No.: 16/766,855

(22) PCT Filed: Nov. 28, 2018

(86) PCT No.: PCT/EP2018/082770
§ 371 (c)(1),
(2) Date: May 26, 2020

(87) PCT Pub. No.: WO2019/105965
PCT Pub. Date: Jun. 6, 2019

(65) Prior Publication Data

US 2020/0298227 A1 Sep. 24, 2020

(30) Foreign Application Priority Data

Nov. 28, 2017 (GB) ..................................... 1719769

(51) Int. Cl.
*B01L 3/08* (2006.01)

(52) U.S. Cl.
CPC ............. *B01L 3/08* (2013.01); *B01L 2300/02* (2013.01); *B01L 2300/0609* (2013.01); *B01L 2300/0627* (2013.01); *B01L 2300/1883* (2013.01)

(58) Field of Classification Search
CPC ....... B01L 2300/025; B01L 2300/0609; B01L 2300/0627; B01L 2300/1883; B01L 3/08;
(Continued)

(56) References Cited

U.S. PATENT DOCUMENTS

| | | | |
|---|---|---|---|
| 5,380,485 | A | 1/1995 | Takahashi et al. |
| 6,103,200 | A | 8/2000 | Babashak |

(Continued)

FOREIGN PATENT DOCUMENTS

| | | | |
|---|---|---|---|
| CN | 201903537 | U | 7/2011 |
| CN | 203678359 | U | 7/2014 |

(Continued)

OTHER PUBLICATIONS

Alaoui et al. "Box-Behnken Design Application to Study Leaching of Pyrolusite from Manganese Mining Residue Using Olive Mill Wastewater as Reductant"Journal of Minerals, Metals and Materials 2015, 67, 1068.

(Continued)

*Primary Examiner* — Maureen Wallenhorst
(74) *Attorney, Agent, or Firm* — Tarolli, Sundheim, Covell & Tummino LLP

(57) ABSTRACT

The invention provides an apparatus including a reactionware and an analytical device for analysing a reaction, the analytical device including at least a plurality of reaction sensors and the analytical device is configured for placement of a plurality of sensors in the reaction space of the reactionware, and optionally the reaction headspace of the reactionware, and the reactionware is a reaction flask having one or more necks, and the analytical device is held in a neck of the reaction flask.

19 Claims, 5 Drawing Sheets

(58) Field of Classification Search
CPC ........... B01L 2300/02; B01L 2200/026; B01L 2200/10; B01L 2200/12; B01L 2200/14
USPC ........................................ 422/68.1, 547, 556
See application file for complete search history.

(56) References Cited

U.S. PATENT DOCUMENTS

| | | | | |
|---|---|---|---|---|
| 2009/0088336 A1* | 4/2009 | Burd | ................ | G01N 33/54366 506/9 |
| 2014/0255910 A1 | 9/2014 | Arnold et al. | | |
| 2015/0132840 A1 | 5/2015 | Arnold et al. | | |

FOREIGN PATENT DOCUMENTS

| | | |
|---|---|---|
| CN | 204544169 U | 8/2015 |
| CN | 206056822 U | 3/2017 |
| CN | 206064452 U | 4/2017 |
| CN | 206381934 U | 8/2017 |
| JP | H10-187251 A | 7/1998 |
| WO | 2010135377 A1 | 11/2010 |

OTHER PUBLICATIONS

Endress & Hauser "Memesens CPS16D".
Search Report for GB 1719769.0 dated May 17, 2018.
Search Report and Opinion for PCT/EP2018/082770 dated Mar. 29, 2019.
Japanese Notification of Reasons for Rejection dated Nov. 10, 2022 and English translation thereof, for corresponding JP Application No. 2020-545885.
Japanese Notification of Reasons for Rejection dated Apr. 10, 2023 and English translation thereof, for corresponding JP Application No. 2020-545885.

* cited by examiner

ANALYTICAL DEVICE AND METHODS OF USE

RELATED APPLICATION

This application is a national stage filing under 35 U.S.C. § 371 of PCT/EP2018/082770, filed Nov. 28, 2018, which claims priority from European Pat. App. No. 1719769.0, filed on Nov. 28, 2017. Each of the above-referenced applications is entirely incorporated by reference herein.

FIELD OF THE INVENTION

The invention provides analytical devices for laboratory reactionware, such as glassware, plasticware and customware, methods for using the analytical devices together with the reactionware, and methods for preparing a reaction apparatus comprising the analytical devices together with the reactionware. Also provided is a network comprising a plurality of analytical devices in communication.

BACKGROUND

Recent developments in chemical and biological reaction analysis have provided analytical devices for real-time monitoring of reaction progress. For the monitoring of many reaction parameters, it is necessary to place the sensor of the analytical device within the reactionware, such as within a reaction flask.

The present inventors have developed an analytical device which provides reproducible reaction monitoring, and as a consequence allows for useful comparisons to be made between different reaction runs.

SUMMARY OF THE INVENTION

The present invention generally provides an analytical device for use with a reactionware, such as a reaction flask, for analysing reactions performed in the reactionware. The analytical device is typically provided with a plurality of sensors to allow for a multidimensional real-time analysis of the reaction of interest.

The analytical device is configured to allow for accurate, reproducible and self-calibrating placement of the sensors within or beside the reactionware, thereby allowing accurate reaction monitoring between experiments, for example using the same reactionware in a subsequent reaction, or using similarly or identically configured reactionware in a different location for a subsequent reaction.

An analytical device may have a plurality of sensors, which sensors may provide distinct or complimentary analytical data in real time, thereby providing a chemical telemetry for the reaction under analysis. A sensor may be provided in a reaction space or a head space of the reactionware, or a sensor may be provided beside the reactionware for analysis of the reaction space or the head space.

An analytical device may be included within a network together with further analytical devices for the analysis of a plurality of reactions. The network may develop data from the reactions for the optimization of reaction conditions. The data may also be used to develop predictive models for reactions of interest. Advantageously, the analytical devices allow for real-time feedback to the network operator, who is provided with a deep understanding of reaction progression in the monitored chemical system.

In a first aspect of the invention there is provided an analytical device for a reactionware, such as a reaction flask, the analytical device comprising at least a plurality of reaction sensors, such as three or more reaction sensors, where the analytical device is configured for placement of a plurality of sensors for analysis of the reaction space and/or the reaction headspace of the reactionware, such as a reaction vessel.

Typically, the reactionware is a reaction flask. The reaction flask may be a round-bottomed flask. The reaction flask has one or more, such as two or three, necks. The analytical device is adapted for placement in a neck of the reaction flask. The analytical device is extendable into the interior of the reaction flask thereby to place the reaction sensors in a reaction space of the reaction flask.

The analytical device may have one or more reaction sensors. The analytical device may be configured for placement of a plurality of sensors in the reaction space and/or reaction headspace of the reactionware. Typically, at least one or two sensors are placed in the reaction space.

The reaction sensors may be selected from the group consisting of a temperature sensor, a pH sensor, a pressure sensor, a conductivity sensor, UV-vis sensor, acoustic sensor, IR sensor, accelerometer, hall sensor, image or movement sensor, and an electrochemical sensor, such as one or more reaction sensors selected from a temperature sensor, a pH sensor, a UV-vis sensor and a pressure sensor.

The analytical device is in communication, such as in wireless or wired communication, with a control device. The control device may send instructions to the analytical device and/or may receive and store analytical data from the analytical device.

The analytical device may have a thermal barrier placed between a sensor element of one of the sensors and the remaining part of that sensor, such as the electronic circuitry of the sensor. The thermal barrier is provided as thermal protection for the remaining parts of the sensor, and particularly for electronic circuitry, where the sensor elements are exposed to reaction mixtures at relatively high and relatively low temperatures. An analytical device may also be provided with a thermal sink for transfer of heat through the device, thereby to limit or prevent adverse local temperatures changes within the device, such as at or beside sensor parts, such as the electronic circuitry of the sensor.

In a second aspect of the invention there is provided a reaction apparatus comprising a reactionware, such as a reaction flask, and an analytical device according to the first aspect of the invention, where the analytical device extends into or beside the reactionware to provide a plurality of sensors for analysis of the reaction space or headspace of the reactionware, such as where the analytical device may be configured for placement of a plurality of sensors in the reaction space and/or reaction headspace of the reactionware.

The reactionware may be a reaction flask, and the analytical device may be held by a neck of the reaction apparatus, and the analytical device extends into the reaction flask to provide a plurality of sensors in the reaction space of the reaction flask.

In one embodiment, a sensor of the analytical device may be provided in a headspace of the reactionware, such as the reaction flask.

In one embodiment, the analytical device is provided together with a second analytical device, which second analytical device is provided in the reactionware and is in communication with the analytical device and is optionally controllable by the analytical device. The second analytical device has a sensor, such as a sensor for use with the analytical device. The second analytical device may be incorporated into a stirrer bar, which may be provided in the reaction space of the reactionware.

In a third aspect of the invention there is provided a method of assembling a reaction apparatus of the invention, the method comprising the step of locating a sensor of an analytical device of the first aspect of the invention in or beside a reactionware, such as in the reaction space and/or reaction headspace of the reactionware.

The method may include the step of inserting an analytical device of the invention into a neck of a reactionware, such as a reaction flask.

In a fourth aspect of the invention there is provided a method of analysing a reaction in a reactionware, such as a reaction flask, the method comprising the steps of providing a reaction apparatus according to the second aspect of the invention, providing a reaction mixture in the reactionware, and permitting the analytical device to analyse the reaction mixture, including components of the reaction mixture located in the reaction space and the headspace of the reactionware.

In a fifth aspect of the invention there is provided a method of assessing a reaction, the method comprising the step of analysing a reaction according to the fourth aspect of the invention, thereby to obtain an analysis of the reaction mixture, and comparing the analysis of the reaction mixture with an analysis of a reference reaction mixture.

The method of assessing a reaction may additionally include indicating to a user an analytical difference in the reaction with the reference reaction.

In a sixth aspect of the invention there is provided an analytical device for a reactionware, such as a reaction flask, the analytical device comprising at least one sensor having a sensor element part and a further part, wherein a thermal barrier is provided between the sensor element part and the further part. The further part may be the electronic circuitry for the sensor, such as a printed circuit board (PCB).

The electronic circuitry may be the part that is adapted to receive data from the sensor element, and it may also be adapted to communicate that data to a control device. This electronic circuitry may also control and power the sensor elements during an analysis. The presence of a thermal barrier provides a thermal resistance within the analytical device between the sensor elements and the electronic circuitry, thereby delaying or limiting the heating or cooling of the electronic circuitry when the analytical device is in use. The electronic circuitry therefore remains operable, even where the sensor elements are exposed to temperatures beyond the limits of the normal operating range of the electronic circuitry.

In one embodiment, the thermal barrier is a gaseous thermal barrier, where the gas in the gaseous thermal barrier is present at atmospheric pressure, at above atmospheric pressure or at below atmospheric pressure, as measured at 20° C., for example.

In a further embodiment the analytical device is provided with a thermal sink in thermal communication with the thermal barrier or a sensor part. The thermal sink may be a metallic thermal sink, such as a metallic strip. The thermal sink may be in thermal communication with the part of the analytical device that is provided outside the reactionware, thereby to provide heat transfer to or from the ambient environment.

Also provided in a seventh aspect of the invention is a reaction apparatus comprising a reactionware, such as a reaction flask, and an analytical device according to the sixth aspect of the invention, where the analytical device extends into the reactionware to provide a sensor element in the reaction space of the reactionware.

Here, the analytical device is configured for placement of the sensor in the reaction space of the reactionware or the reaction headspace of the reactionware, and the reactionware is a reaction flask having one or more necks, and the analytical device is held in a neck of the reaction flask.

These and other aspects and embodiments of the invention are described in further detail below.

DETAILED DESCRIPTION OF THE INVENTION

Figure 1:
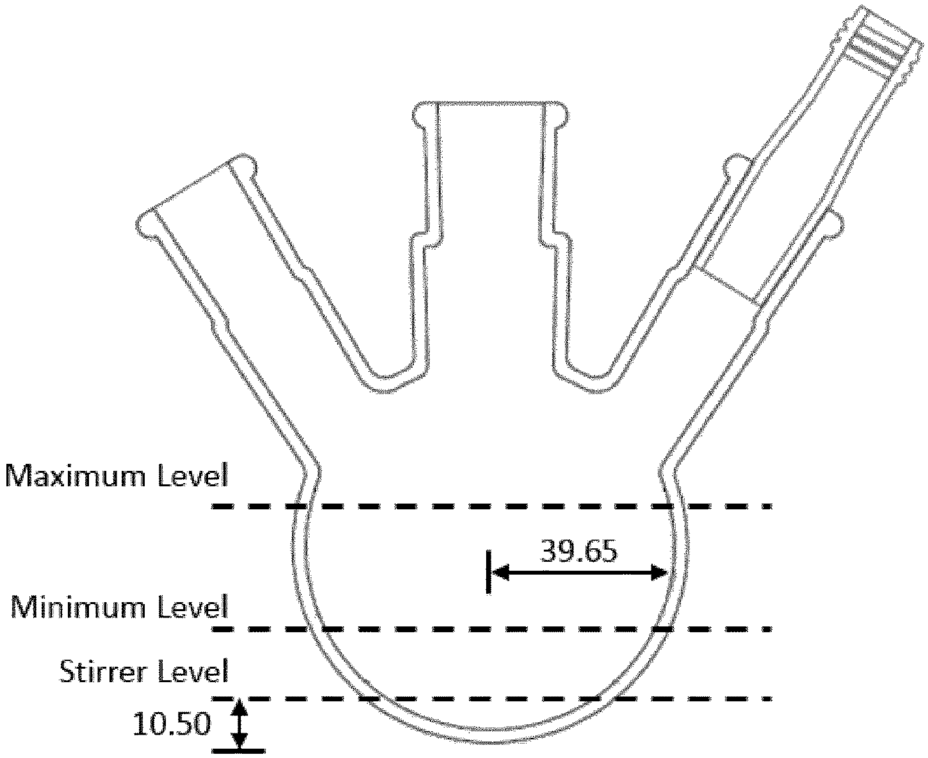
FIG. 1 is a schematic of (a) a standard three-necked round-bottomed reaction flask having a standard tapered (quick-fit) joint in each neck; and (b) a reaction apparatus according to an embodiment of the second aspect of the invention, the apparatus comprising the reaction flask of (a) together with an analytical device according to an embodiment of the first aspect of the invention, where the analytical device is provided in a neck of the reaction flask.
Figure 1:
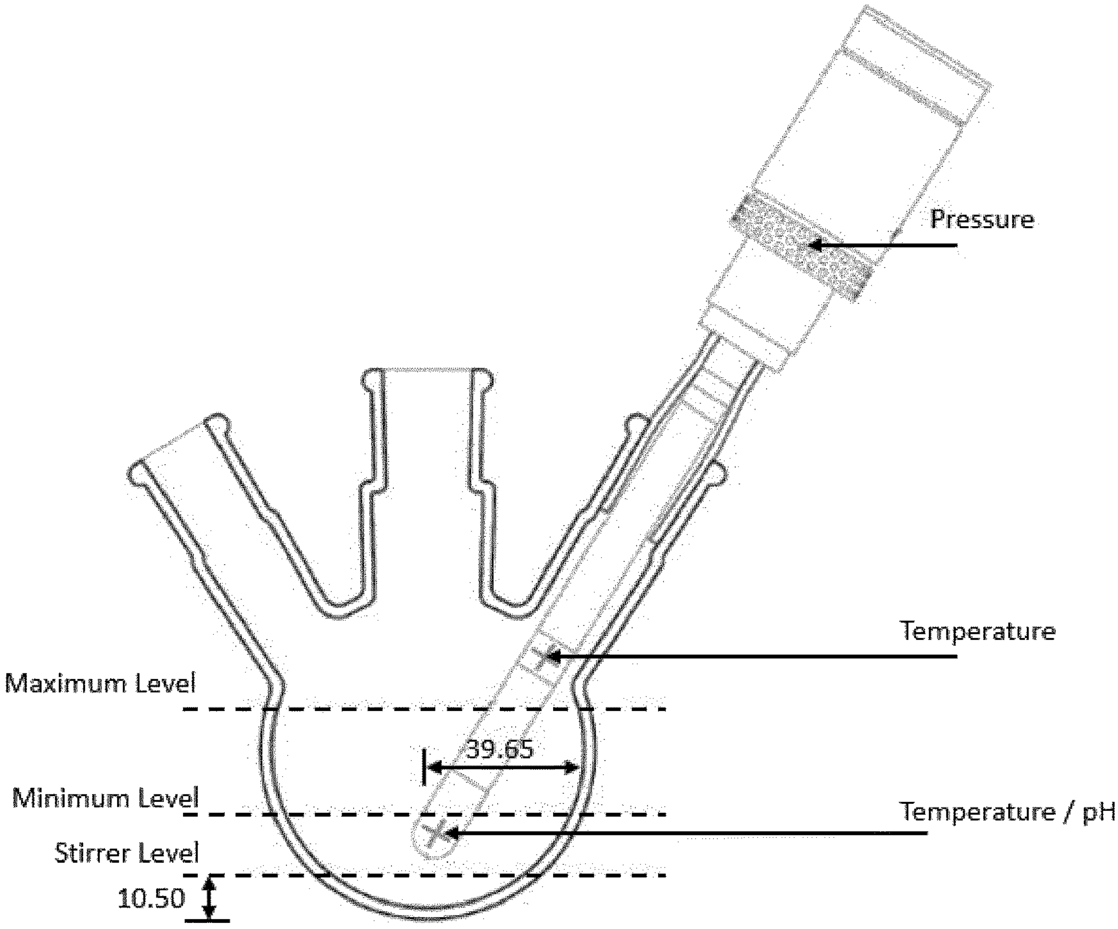

The present invention provides an analytical device suitable for use with reactionware, such as reaction flasks. The analytical device may be used to generate data for characterization of a reaction performed in a reactionware. This reaction profile may be combined with reaction profiles for reactions conducted under alternative reaction conditions to generate an understanding of the reaction conditions under investigation. Further, the reaction profiles may be used to guide a future performance of the reaction, for example to show where there is an analytical difference between a subsequent reaction compared with a reaction standard. In this way, the analytical device may be used to show where there is a departure from a reaction standard, and it may be used to indicate possible reaction failures, for example at an early stage of a reaction.

Reactionware

The analytical device of the invention is suitable for use together with standard reactionware, such as a reaction flask, and more preferably a standard laboratory round-bottomed flask.

The reactionware has a reaction space suitable for holding a reaction mixture. Sensors of the analytical device are located in or beside this reaction space for analysis of a reaction mixture. The reactionware may also have a head space above the reaction space. A sensor of the analytical device may be located in or beside this head space.

A reaction flask may be a round-bottomed flask, a conical flask (flat-bottomed flask), or a Florence flask. The reaction flask is typically a round-bottomed flask.

A reactionware may also be a vial, such as a glass vial, and the sensors of the analytical device may be adapted for placement in or beside the vial, such as to allow for reaction monitoring of the vial contents and/or the headspace above the vial contents.

Similarly, the reactionware may be a reaction cartridge, such as a reaction cartridge having a semi-porous frit. A reaction cartridge typically finds use in solid phase synthesis. The sensors of the analytical device may be adapted for placement in or beside the reaction cartridge, such as to allow for reaction monitoring of the cartridge contents and/or the headspace above the cartridge contents.

In one embodiment, a vial or cartridge may be provided in an array of vials or cartridges, for example, as might be provided for parallel syntheses (such as library synthesis). Each vial or cartridge may be independently provided with an analytical device according to the invention. Alternatively, a single analytical device may be provided with a sensor array, where each sensor array has a plurality of sensors. Here, individual sensors are provided for each vial or cartridge.

The reactionware, such as a flask, may have a volume of 5 mL, 10 mL, 25 mL, 50 mL, 100 mL, 250 mL, 500 mL, or 1,000 mL (1 L) or more, and preferably a volume of 250 mL or 500 mL.

The reaction flask, such as a round-bottomed flask, may have a volume of at least 25 mL.

The reaction flask, such as a round-bottomed flask, may have a volume of at most 500 mL.

The reactionware, such as a vial or cartridge, may have a volume of 0.1 mL, 0.3 mL, 0.5 mL, 1.0 mL, 1.5 mL. 2 mL, 4 mL, 5 mL, 7 mL, 15 mL, and 22 mL.

The reaction flask, such as a vial, may have a volume of at least 1.0 mL.

The reaction flask, such as a vial, may have a volume of at most 5 mL.

A reactionware may be a glassware. Polymer-based reactionware may also be used. Typically a wall of the reactionware defining the reaction space is clear, so as to allow simple visual inspection of the reaction space and the head space. A wall may permit transmittance of IR, UV and/or visible light, allowing the reactionware to be used together with IR, UV and visible light sensors, which may be placed beside the reactionware, for analysis of the contents of the reaction space and/or the head space. Such sensors may be component of the analytical device, or may be provided with other analytical devices that are not devices of the invention.

A reaction flask may have one or more, such as two or three, necks, and these may be joints to receive the analytical device, which device may be provided with a cooperating joint. Typically the reaction flask has two or more necks. The analytical device may be held in one neck, and the other neck may be used, for example, to add or remove reagents, solvents, catalysts and gases, and so on, to and from the reaction flask.

Each joint may be a (frusto) conical joint, which is a standard joint for chemical and biological reaction flasks.

Each neck of the reaction flask may have a standard joint, such as a female tapered joint (socket). Here, the analytical device may be provided with a male joint (cone) for insertion into the female joint.

The taper in the joint may be a standard 1:10 taper ("Standard Taper").

The joint may be selected from the group consisting of 5/20, 7/25, 10/30, 12/32, 14/35, 19/26, 19/38, 24/29, 24/40, 29/42, 34/45, 40/50 45/50, 50/50 and 55/50 joints.

Preferably the joint is a 24/29 or a 19/26 joint. Such a joint is routinely used for reaction flasks having a volume of 25 mL or more, such as 50 mL or more.

In other embodiments, such as where the reactionware is a vial, the neck may be a screw top neck or a crimp top neck. Here, typically, the reaction flask has only one neck.

Where a reactionware has a screw top neck, the analytical device may be provided with a suitable screw neck for interaction with the screw top of the reaction flask.

Where a reactionware has a crimp top neck, the analytical device may be provided with a crimp seal for interaction with the crimp top of the reaction flask.

Where the reactionware is a glass reactionware, each joint may be a ground glass joint. The reactionware may be provided with means for agitating a reaction mixture contained within. This may be a stirrer.

The reactionware may be provided with a stirrer bar, such as a magnetic stirrer bar. Here, the reactionware may also be provided together with a magnetic stirrer for control of the magnetic stirrer bar. The stirrer bar may itself also be a second analytical device, and it may be in wireless communication with the analytical device of the invention, and the stirrer bar is optionally controllable by the analytical device. Where a control device is present, the stirrer bar may be in communication with a control device, and the stirrer bar is optionally controllable by the control device.

The reactionware may be provided together with an overhead stirrer. Here, a stirring paddle is placed in the reactionware, and this paddle is moved, such as rotated, by a stirring rod which is connected to the paddle and a motor placed above the reactionware. Such overhead stirrers are common in large scale methods of preparation and for reactions where the reaction mixture has a high viscosity. This is less preferred in the systems and methods of the present case, owing to the amount of equipment required to effectively operate the overheard stirrer, compared with a stirrer bar.

The reactionware may be provided together with a shaker, such as an orbital shaker, for agitations of the reactionware together with its contents. This is less preferred for reaction flasks such as a round-bottomed flask. This is more preferred for reactionware such as vials and cartridges.

In one embodiment the reactionware holds a reaction mixture, and the analytical device may be used to monitor changes in this reaction mixture over time. The reaction mixture is described in further detail below.

The reactionware may be additionally provided with conventional apparatus for the delivery and/or removal of components to and from the reaction space. Thus, the reactionware may be provided with gas lines for the supply of inert or reactive gases, and dropping funnels, syringe pumps or septa for the supply of liquids. The reactionware may be provided with a valve, such as a stopcock, for the release of material from the reaction space of the reactionware.

The analytical device may be located in a fume hood, for example together with the reactionware, as part of an analytical apparatus of the invention.

In a further embodiment of the invention, the reactionware may itself incorporate a part of a sensor, such as within a wall of the reactionware. In particular, the reactionware may incorporate part of a sensor, such as a sensor element, and that part may be provided at a part of the reactionware that is exposed to the reaction space or the headspace.

Where a part of the sensor is provided in the reactionware, that sensor is communicable with parts of the sensor that are provided in the analytical device. When the analytical device is provided with the reactionware, the analytical device is in communication with the part of the sensor in the reactionware.

As an example, the reactionware may incorporate electrodes that are provided in a wall of the reactionware that is exposed to the reaction space. The analytical device may be provided with the electrical circuitry for electrical contact with the electrodes, thereby to allow for electrochemical analysis of a reaction mixture within the reactionware.

Analytical Device—Plurality of Sensors

In one aspect of the invention, an analytical device is provided with a plurality of sensors for analysis of a reaction mixture. Typically the sensor has two or more sensors, and preferably more than two sensors, such as three or four sensors, though the analytical device may have more, such as five, six, seven, or eight or more sensors.

Many of the analytical devices known in the art for use with reactionware comprise a single sensor only. Typically, the analytical device may be held in a neck of the reactionware, permitting the single sensor to analyse the environment in the reaction space or the head space. Where a user wishes to use a plurality of sensors, each sensor is provided within a separate analytical device, and each device is held separately within a neck of a reaction flask. The number of available necks in the flask is limited, maybe no more than three in total, and one or more of these may be required for use with other reaction apparatus, such as addition apparatus and so on, thereby further limiting the number of analytical device that may be used.

Alaoui et al. shows a reaction flask holding analytical devices in each neck of the reaction flask. Nothing is said about a single analytical device holding multiple sensors, and that device being placed in one neck of the flask.

As further examples, CN 206065562 discloses a reaction flask where one neck of the reaction vessel holds a temperature monitor. The other necks are occupied by reaction apparatus. CN 204544169, CN 203678359 and CN 206056822 also disclose reaction flasks where one neck of the reaction vessel holds a single temperature sensor.

In other situations, multiple independent analytical devices may be placed in a single neck of a reaction flask. Here, the arrangement of the devices may be troublesome, owing to crowding, and the placement of individual sensors in each device may not be optimal. Each sensor must be individually arranged to achieve an appropriate placement in the flask.

For example, U.S. Pat. No. 5,380,485 shows a reaction flask having a pH sensor and a level sensor in the neck of the reaction flask. There sensors are not are not part of the same analytical device, and each is provided independently of the other.

WO 2010/135377 discloses a reaction flask that is a bioreactor. The reactor has a single opening (which appears not to be a neck) and placed in this opening is a pH meter, a redox probe, an oxygen probe and a sampler. However, these sensors are not all part of the same analytical device, and they are shown independently of one another.

JP H10-187251 shows the placement of multiple sensors through the neck of a reaction flask. These sensors are not all part of the same analytical device. Instead, each sensor must be individually inserted into the reaction flask through the septum that is placed in the neck.

CN 201903537 apparently describes an analytical device that includes a temperature sensor and a pH sensor within the same unit. However, this document does not disclose or suggest the use of more than two sensors in an analytical device, and there is no discussion of the placement of those sensors in relation to the reaction head space or the environment.

Generally, the sensors are not limited. However, the sensors may be selected from the group consisting of pH sensor, acoustic (sound) sensor, IR sensor (IR spectrometer), UV-vis sensor (UV and/or visible light spectrometer), including a colour sensor or a luminosity (luminance) sensor, pressure sensor, temperature sensor, accelerometer, hall sensor, movement sensor, image sensor, such as still or video imagery, conductivity sensor, electrochemical sensor (redox sensor), gravity sensor, accelerometer, and phase boundary sensor (for example, using captive surface measurements).

The analytical device may have one or more, such as all, of the sensors selected from the group consisting of pH sensor, acoustic sensor, IR sensor, pressure sensor, temperature sensor, image sensor, conductivity sensor and electrochemical sensor. The plurality of sensors may be entirely selected from this group.

The analytical device may have one or more, such as all, of the sensors selected from the group consisting of pH sensor, conductivity sensor, image sensor, such as still or video imagery, IR sensor (IR spectrometer), UV-vis sensor (UV and/or visible light spectrometer), including a colour sensor or a luminosity (luminance) sensor, and acoustic (sound) sensor. The plurality of sensors may be entirely selected from this group.

In one embodiment, the analytical device does not consist of a temperature sensor and a pH sensor.

The sensors for use in the analytical device are typically commercially-available sensors. The sensors may be modular in nature, and are suitable for easy substitution between analytical devices, such that large changes to the analytical device are not needed when a change in sensor is required for a particular application.

Typically each sensor in the analytical unit is different. For example, the analytical device may be provided with a temperature sensor and a pH sensor; or a temperature sensor, a colour sensor, a luminosity sensor and a pressure sensor; or a movement sensor, an IR sensor, and a UV sensor; or an acoustic sensor, image sensor and a phase boundary sensor.

However, sometimes there may be two of the same sensors, and these may be provided to allow for analysis of different areas of the reaction vessel, such as different regions of the reaction mixture contained in the reaction space, for example where changes in physical and chemical properties may be expected through the reaction mixture during reaction. Multiple sensors of the same type may also be provided where data of the same type is collected from the reaction mixture in the reaction space and from the head space. As explained in further detail below, sensors may also be provided to collect data from the ambient environment, and the data from these sensors may be used for comparison with data from similar sensors collecting data from the reaction space and reaction headspace environments.

Where a pH sensor is present, such may be suitable for measuring pH within a range of at least pH 1 to 13, and preferably to a resolution of 0.5 or less. The pH sensor may be capable of a variable sampling rate. The pH sensor may be capable of a sampling rate of at least 10 readings per second. The pH sensor is typically provided for pH measurement of aqueous mixtures. The pH sensor may measure the open circuit of a reaction mixture.

Where a temperature sensor is present, such may be suitable for measuring temperature within a range of at least 0 to 100° C., such as −10 to 300° C., such as −100 to 300° C., and preferably to a resolution of 0.1° C. or less. The temperature sensor may be capable of a variable sampling rate. The temperature sensor may be capable of a sampling rate of at least 10 readings per second.

Where a pressure sensor is present, such may be suitable for measuring the pressure difference between the inside of the reactionware and the external environment. The pressure sensor may be suitable for measuring pressure within a range of at least 10 Pa to 2 MPa.

Where an acoustic sensor is present, such may be suitable for detecting the addition of material, such as solids, the reaction space, and for detection acoustic signals associated with phase changes, such as crystallisation and precipitation events. The acoustic sensor may also allow the fill level of the reaction space to be determined, and may also allow the material added to the reactions space to be characterised.

The sensors for use in the invention may be selected for their low power consumptions whilst in use, and whilst not in use.

For example, the power consumption whilst in use may be about 1.2 mW at most.

For example, the power consumption in an unused state may be 1 mW at most, such as 0.5 mW at most, such as 0.2 mW at most.

The analytical device is provided with a housing for holding components for use with the sensors, such as a power supply and a communication device for communicating collected data to a control device. This may be a wireless or wired communication device.

The sensors may have exposed sensor elements for contact with the local environment, such as the reaction space and the headspace of a reaction flask. The sensors may be located at the outer surface of the housing, such as that part of the housing that is located with the reactionware when in use. The remaining parts of the sensor may he held within the housing, such as sealed within the housing, and the sensor elements may be in communication with those parts, such as electrical communication.

The sensors may be located within the housing, such as that part of the housing which is itself is located with the reactionware when in use. The sensors may be capable of analysing the reaction space or head space of the reactionware where the housing permits transfer of a detectable signal from the reaction space or head space to the internalised sensor.

For example, the internal sensor may be a spectroscopic sensor, such as an IR sensor (IR spectrometer), UV-vis sensor (UV and/or visible light spectrometer), including a colour sensor or a luminosity (luminance) sensor. Here, the housing has a wall, or window within a wall, that is transparent to the electromagnetic radiation that is to be detected.

Similarly, the housing may permit transfer of an acoustic signal from the reaction space or head space to an internal sensor.

The sensors of the analytical device are for placement in or beside the reactionware for analysis of the reaction space or the head space of the reaction vessel.

Preferably one or more, such as two or more, sensors are provided in a reaction space or a head space of the reactionware.

The analytical device is preferably configured for use with a reaction flask having a neck, and the analytical device may be partially located and held in the neck of the reaction flask.

The analytical device may be held securely by the neck of the reaction flask, for example by interaction of the neck, such as a female neck joint, with a cooperating part of the analytical device, such as a male joint.

Thus, in one embodiment, the analytical device is provided with a joint, such as a male joint, for cooperation with a joint, such as a female joint, of the reaction flask. The joint of the analytical device may be a collar at least surrounding at least part of the housing.

The neck holding the analytic device may be a female tapered joint, and the analytical device may be adapted to be held in that joint.

CN 201903537 discloses an analytical device including a mounting member. This member is not tapered and therefore is not suitable for use together with standard tapered joints within reactionware, such as glassware.

The joint of the analytical device may be a joint for cooperation with the preferred joints of the reactionware described above. For example, the joint of the analytical device may be a male joint, and preferably this may be for cooperation with a female joint, such as a 24/29 or 19/26 joint. Each joint may be a ground glass joint.

In one embodiment, the joint is moveable with respect to the housing. In this way, the location of the joint with respect to the sensor elements may be adjusted, thereby allowing for adjustment of the sensors locations. In this way, the analytical device may be adapted to allow for placement of the sensor elements in different locations within the same reactionware, and the analytical device may be adapted to allow for placement of the sensors at appropriate locations within a different reactionware, such as a reaction flask having a different design or volume.

The analytical device may be provided with suitable markings, such as on the housing, to allow the joint to be moved between marked positions to accommodate different-shaped and different-sized reaction flasks.

The connection between the housing and joint of the analytical device may be sealed, thereby to prevent passage of gases and liquids from the reactionware from the reactionware via this joint. Suitable seals may be provided between the housing and the joint.

A connection between the joint of the analytical device and the joint of the reaction flask may be sealed, thereby to prevent passage of gases and fluids from the reactionware from the reactionware via this joint. Here, the seal is provided by ground glass joints on both joints.

The analytical device is adapted to sit in the reactionware such that at least one, such as two, sensors are provided in the reaction space of the reactionware, and are contactable by a reaction mixture held by the reactionware in that space.

Typically one sensor of the analytical device is provided in the reaction space of the reactionware, and two, or more, sensors may be provided in the reaction space of the reactionware.

Optionally one sensor of the analytical device may be provided at a headspace of the reactionware, for example to measure a property of the region above the reaction mixture.

For example, a pressure sensor may be provided at a head space to analyse pressure and changes in pressure during a reaction.

The analytical device of the invention may be configured for placement in the reactionware such that the device is placed above the level of a stirrer or a paddle, where such are present for the agitation of the reaction mixture. Thus, the analytical device of the invention does not disrupt the operation of the stirrer or paddle to agitate the reaction mixture.

Optionally the analytical device may be provided with one or more sensors for location outwith the reactionware. Such a sensor may be provided for the analysis of the ambient environment, for comparison with the environment within the reactionware. For example, a temperature or pressure sensor may be provided for this purpose. Such sensors may be provided in the housing with the sensors elements located at a surface of the housing that is held outside the reactionware in use.

A sensor of the analytical device may be provided outside the reactionware for analysis of the internal reaction space or internal head space. Typically a sensor placed outside the reactionware is a spectroscopic sensor, such as an IR sensor (IR spectrometer), UV-vis sensor (UV and/or visible light spectrometer), including a colour sensor or a luminosity (luminance) sensor. Here, the reactionware has a wall, or window within a wall, that is transparent to the electromagnetic radiation that is to be detected. The sensor may be placed beside, such as in close contact or in contact with, the reactionware.

A sensor of the analytical device may be provided, at least in part, within the reactionware, such as within a wall of the reactionware, such that the sensor is exposed to the reaction space or head space of the reactionware. Here, the reactionware may incorporate one or more electrodes as part of a sensor element, which electrodes are electrically connectable to another part of the sensor element which is placed in our outside the reactionware.

The analytical device may be provided with a power supply, such as a battery. The power supply may provide power for each of the sensors. The power supply may also provide power for the transmittal of data, such as the wireless transmittal of data, from the analytical device to a control device. Where a power supply is present it is sufficient to power the sensors for the course of a reaction, such as sufficient to power the sensors for at least 12 h, such as at least 24 h, such as at least 48 h.

The analytical device may be provided with a memory device for storing analytical information, for example prior to its transmission to a control unit. Where a control device is present, this may also be provided with a memory device for storing analytical information from the analytical unit, for example prior to the transmission of the data to a network.

Where the analytical device has a power supply it is also provided with means for charging the power supply, such as an electrical connector, such as a USB or micro-USB connector. The electrical connector may be provided with a removable cover to ensure that the connector is not exposed to the laboratory environment. Alternatively, the analytical device may be wirelessly rechargeable.

In an alternative embodiment the power supply for the analytical device is provided by a control device, with which the analytical device may be in electrical communication.

The power supply, the wireless communicator and the memory device may be provided in the housing, and they may be provided in that part of the housing that is located outside of the reactionware when the analytical device is paired with the reactionware.

In a further embodiment, the analytical device is provided with a sampler to remove a sample from the reactionware, such as a sample from the reaction space, where the reaction mixture is held, or the head space. The sample may be removed from the reactionware under the control of the analytical device, and therefore intervention from a user is not required.

An extracted sample may be provided to one or more external analytical devices for analysis. For example, the sample may be removed for analysis by mass spectrometry, such as LCMS or GCMS, or NMR, such as $^{1}H$ or $^{13}C$ NMR. A sampling strategy is useful for the analysis of a reaction mixture under circumstances where it is not practicable to accommodate the relevant spectrometer into an analytical device of the invention. The sampler may allow a user to obtain additional chemical information on the reaction performed in the reactionware.

The analytical device may be provided with indicators to show the charging status of a power supply in the device, such as fully charged, low charge, or charging for a battery power supply.

Similarly, the analytical device may be provided with indicators to show the communication status of the sensors of the analytical device with a control device, such as to indicate the communication of data wirelessly from the device to the control device.

Where an indicator is provided, this is typically a light indicator, such as an LED, and this is located at an outer surface of the housing.

The analytical device may be provided as a kit together with a case for holding the analytical device optionally together with a power charger for a power supply to the analytical device. Instructions may be provided with the analytical device. The kit may optionally further comprise a reactionware, such as a reaction flask described herein.

Analytical Device—Thermal Barrier

In another aspect of the invention there is provided an analytical device for a reactionware, such as a reaction flask, the analytical device comprising at least one sensor having a sensor element part and a further part, wherein a thermal barrier is provided between the sensor element part and the further part. The further part may be the electronic circuitry for the sensor, such as a printed circuit board, and this is in communication with sensor element.

In use, the analytical device may be exposed to reaction mixtures at very high or very low temperatures, and some reaction procedures may involve transitions between high and low extremes. The electronic circuitry used in many standard sensors has a limited temperature operating range, and the performance outside of the range may be unreliable or unpredictable. Typical printed circuit boards, for example, are deemed reliably operable only between −20 and 60° C. The operation of an analytical device may therefore be limited to reactions performed at these moderate temperatures unless the sensors in the device are adapted for use outside the standard temperature operating range of the electronic circuitry.

A sensor that is operable in the range −20 and 60° C. could only find use in around 60% of reported reaction procedures, whilst a sensor that is operable in the range −80 to 200° C. would find use in around 98% of reported reaction procedures.

The analytical device may comprise one or more sensors, such as a plurality of sensors, where each sensor may be a sensor as described above for the analytical device of the first aspect of the invention. Most preferably the device has three or more sensors. The analytical device may an analytical device such as described above having a plurality of sensors.

The analytical device is configured for placement of the one or more sensors in the reaction space of the reactionware, and optionally the reaction headspace of the reactionware, and the reactionware is a reaction flask having one or more necks, and the analytical device is held in a neck of the reaction flask. The configuration of the analytical device for placement in a reactionware such as a reaction flask may be as described above for the analytical device of the first aspect of the invention.

The present inventors have established that a thermal barrier may be inserted between parts of a sensor thereby to limit or prevent thermal transfer between those parts of the sensor. Thus, a thermal barrier may be provided between the sensor element of the sensor, which is the part of the sensor that is exposed to and the other parts of the sensor, such as the electronic circuitry. The sensor element remains in communication, such as electrical communication, with the remaining part of the sensor.

The thermal barrier may be any material, or combination of materials, that prevents or limits thermal conduction from the sensor element to the remaining parts, such as the electronic circuitry, of the sensor.

In one embodiment, the thermal barrier may be provided by a fluid, typically a gas, that is held between the sensor parts. Here, the gas may be air, or another mixture of gases, or a single inert gas, such as nitrogen, argon or xenon. The gaseous thermal barrier may be provided in a chamber, and the gas contained within may be provided at atmospheric pressure, above atmospheric pressure or at below atmospheric pressure, such as at atmospheric pressure or at below atmospheric pressure, such as measured at 20° C. The chamber is typically a sealed chamber.

In one embodiment, the thermal barrier may be provided by a solid thermal insulating material that is placed between sensor parts.

The amount of thermal barrier material within the analytical device may be maximised in order to minimise heat transfer to and from and through the analytical device.

The presence of a thermal barrier is particularly important given that the materials used in the sensor element of the sensor may be good thermal conductors, and as such, the sensor elements themselves may provide thermal conduction from the reaction mixture to the internal parts of the analytical device. For example, where the analytical deice is provided with a conductivity sensor, the sensor elements for that conductivity sensor are typically electrically conductive surfaces, such as gold, and such surfaces are also typically good thermal conductors.

It will be apparent that it is preferable to locate heat sensitive parts of the sensor, such as the electronic circuitry, as far as possible from the sensor elements, in order to minimise the exposure of those heat sensitive parts to the thermal assault experienced by the sensor elements, which are require to contact the reaction mixture or the reaction headspace within the reaction chamber. However, it will be appreciated that for the operation of the sensor elements it may be necessary also to locate the electronic circuitry within the part of the analytical device that is located within the reaction flask, and located thus, these parts will be exposed to some form of thermal assault, and a suitable thermal barrier is provided in order to minimise or prevent any significant thermal exposure.

The material for the housing of the analytical device may comprise a material that has a low thermal conductance. This material will limit thermal transfer from the reaction mixture in the reaction chamber of the reactionware to the internal components of the analytical device. Example materials for use include glasses and ceramics. In a particularly preferred embodiment, the material is a silica glass.

The internal components of the analytical device may be provided and located so as to minimise heat transfer within the device from a sensor element to its associated electronic circuitry, such as a printed circuit board. For example, components of the analytical device may be spaced from the housing so as to minimise heat transfer from the housing directly to the internal components.

Further, within the analytical device, the cross-section area of components within analytical device may be chosen to influence the thermal conductivity through the analytical device from the part of the device that is located within the reactionware, to that part of the reactionware that is located outwith the reactionware.

For example, the cross-section of components within the analytical device may be minimised thereby to minimise later heat transfer across the device, instead promoting heat transfer through device, for example in thermal communication with a thermal sink, to minimise temperature changes within the device, and particularly temperature changes within the electronic circuitry of the analytical device.

The housing material having a low thermal conductance may be provided at the part of the analytical device that is for extension into the reaction space of the reactionware.

The analytical device may be provided with a thermal sink, and such may be in thermal communication with the thermal barrier, where such is present. The thermal sink may permit heat transfer to or from the thermal barrier to limit or prevent temperature changes to the other parts of the sensor, such as the electronic circuitry. The thermal sink may be in thermal communication with the part of the analytical device that is provided outside the reactionware. Thus, the thermal sink may be adapted to allow thermal transfer from the analytical device to the ambient surroundings.

The thermal sink may be in thermal communication with one or more sensors. Thus, the thermal sink permits heat to or from a sensor to limit or prevent temperature changes to that sensor.

The thermal sink may be a metallic thermal sink, such as a metallic strip. Example metals for use in the thermal sink include copper and aluminium, amongst others, and preferably copper.

Heat transfer to and from the thermal sink may be enhanced by increasing the surface area of the thermal sink in the part of the analytical device that is located outside the reactionware. A part of the thermal sink may be provided at an outer surface of the analytical device for heat transfer directly to and from the atmosphere. Alternatively, the heat transfer may occur through the analytical device housing, which may be provided in thermal communication, such as in contact, with the thermal sink.

A greater portion of the thermal sink, for example as measured by surface area, volume or mass, may be located in the part of the analytical device that is provided outside the reactionware. In this arrangement, the exposure of the heat sink to the ambient surroundings is increased, and consequently thermal dissipation is increased.

In some cases a sensor of the analytical device may contain sensor elements that have excellent thermal conductance, and these sensor elements may allow heat transfer to and from the analytical device. For example, in some embodiments of the invention, an analytical device may include an electrochemical sensor, and such may comprise one or more, such as two or three, metal electrodes, such as copper or silver electrodes. A thermal barrier and/or a thermal sink may be provided to limit or prevent the heat transfer from those sensor element to other parts of the sensor or other parts of the analytical device.

The analytical device may have a plurality of sensors, and therefore the thermal barrier may be present in an analytical device according to the first aspect of the invention. Accordingly, the analytical device of the sixth aspect of the invention, and the analytical apparatus of the seventh aspect of the invention, may be used in the same way as the analytical device according to the first aspect and the analytical device of the second aspect.

Analytical Apparatus

An analytical apparatus, or reaction apparatus, of the present invention comprises an analytical device of the invention together with a reactionware, optionally together with a control device in communication with the analytical device.

The analytical device and the reactionware are connected such as to provide the sensors of the analytical device in or beside the reaction space and/or the headspace of the reactionware.

As explained above, an analytical device may be held in a joint of the reactionware.

The joints between the analytical device and the reaction flask may be provided with clips, such as are known in the art to prevent movement of the components, for example where there are changes in pressure.

Preferably the analytical device may be supported by the reactionware itself. Where the reactionware is relatively small, or relatively unstable, it may be appropriate to provide support for the analytical device.

The apparatus may additionally comprise standard apparatus for performing a reaction in the reactionware, such as a stirrer, a hotplate, a heating or cooling bath and so on.

The analytical device may be used in combination with one or more additional analytical devices for monitoring a reaction. These additional devices, with their sensors, may be located outside the reactionware.

An analytical apparatus may further include a control device in communication with the analytical device. The control device may be in wired or wireless communication with the analytical device, such as wireless communication.

The control device may be a standard computer suitably programmed to operate the analytical device and/or to receive and store analytical data from the analytical device.

As noted above, a control device is in communication with an analytical device of the invention. In further embodiments, the control device may be in communication with a plurality of analytical devices, where each device may be a device of the invention. The control device may therefore form a network with a plurality of analytical devices, where each analytical device may be located in a different location, such as a different fume hood, such as in a different laboratory. An analytical device may communicate with the control device via a network. The control device may itself be plurality of computer devices in communication across a network.

The control device may also be in communication with one or more analytical devices that are not devices of the invention. Such devices may provide analytical data that is not obtainable by the device of the invention, for example where the device is not provided with appropriate sensors to records a reaction parameter. Thus, these other devices may be used to compliment the devices of the invention.

The control device is suitable for storing and displaying collected analytical data from the analytical device. It may also be suitably programmed to compare analytical data obtained from a plurality of reactions, such as a plurality of reactions conducted in the same reactionware, or a plurality of reactions conducted in different reactionware.

Thus, the analytical apparatus may also include a display for showing the data recorded by the analytical device.

The control device may be provided with a user interface for the control of the analytical device by the user.

The analytical apparatus may be additionally provided with a second analytical device for use together with the analytical device, which here may be referred to as the primary analytical device. The second analytical device has one or more sensors located in the reaction flask, such as located in the reaction space of the reaction flask.

The second analytical device may be used to compliment or supplement the primary analytical device. The second analytical device may have a sensor that is not included in the primary device. Thus, the second analytical device may provide additional analytical information about the reaction under analysis. The second analytical may have sensors in common with the primary analytical device. Thus, the second analytical device may provide confirmatory data to the data collected by the primary analytical device.

A sensor of the second analytical device in common with a sensor with the primary analytical device may be spatially separated from that other sensor in the reaction space of the reaction flask. Here, the second analytical device may be used to show differences in chemical and physical properties of the reaction mixture across the reaction space. For example, where the primary and secondary analytical devices have temperature sensors, these sensors may be use to show the presence of temperature gradients within a reaction mixture.

The second analytical device may be in communication, such as wireless communication, with the first analytical device. For example, the data collected by the one or more sensors of the second analytical device may be transmitted to the primary analytical device, for communication to the control device.

The primary analytical device may also control the second analytical device, and therefore the primary and secondary analytical device are adapted for communication with one another.

The second analytical device may be contained within a stirrer, such as a stirrer bar. Here, the second analytical device can be intimately contacted with the reaction mixture in the reaction space.

The second analytical device may be provided with a power supply for providing power to the one or more sensors, and optionally to provide power for communication of sensor data, for example to the primary analytical device.

Use of Analytical Device and Reaction Apparatus

The analytical devices of the invention may be provided as part of a reaction apparatus for monitoring the progress of a reaction in a reactionware. The reaction may be a chemical or biological reaction.

In one aspect of the invention there is provided a method of analysing a reaction in a reactionware, such as a reaction flask, the method comprising the steps of providing a reaction apparatus having a reactionware together with an analytical device of the invention, providing a reaction mixture in a reaction space of the reactionware, and permitting the analytical device to analyse the reaction mixture, for example over time.

The methods of the invention may be used to analyse changes in the reaction mixture over time. These changes may be chemical changes, such as the formation of new products and the consumption of reagents, for example resulting from the formation or breaking of covalent and/or non-covalent bonds. These changes may be physical changes, such as the crystallization of a component of the reaction mixture. The methods of the invention may also be used to generate an analytical profile of the reaction to show how physical parameters change over time, such as changes in the temperature, colour, sound and pressure. Such an analytical profile may be used to gain an understanding of the reaction progression and the reaction results, and they may be used for comparison against other reaction profiles to gain an understanding of differences in reaction outcome.

The analytical device may operate over at least part of the reaction course, such as from reaction initiation to formation of the product, such as to reaction completion. The analytical device may be used to obtain a profile for the reaction, which is obtained from the analytical data recorded by the plurality of sensors.

Thus, for example, the profile may show the changes in temperature, reaction mixture colour, pH and pressure during the course of the reaction. The reaction profile may record changes in the reaction mixture contained in the reaction space, as well as changes in the head space.

The method of the invention may include performing the reaction a plurality of times under different reaction conditions, and obtaining a profile for each reaction. For each reaction a reaction outcome is recorded, and this reaction outcome may be used to evaluate the usefulness of particular reaction condition against the other reaction conditions. For example, a reaction outcome may be product yield, reaction rate, reaction temperature, such as maximum reaction temperature, and purity, amongst others.

A reaction may differ in one or more reaction conditions, such as reaction temperature, relative and absolute amounts of one or more reagents, solvent and catalysts.

In a further aspect of the invention there is provided a method of assessing a reaction, the method comprising the step of analyzing a reaction as described above, thereby to obtain a profile of the reaction, and comparing the profile of the reaction with a profile of a reference reaction. The comparison step may be performed in real time whilst the reaction is underway.

Here, a reference reaction may be an optimised reaction, such as a reaction having a desirable reaction outcome, such as a desirable yield of product.

In this method the user may be provided with an indication of the likely course of the reaction underway. A comparison between a selected reaction profile and the profile of the reference reaction may show a departure of the reaction from a desired reaction outcome. This information may allow the user to adapt the reaction to ensure a successful reaction outcome. Alternatively, the information may allow the user to abandon the reaction without having to take the reaction to completion, where such completion is likely to be an unsuccessful completion of the reaction.

Accordingly, there is provide a method of analysing a reaction in a reactionware, the method comprising the steps of providing a reaction apparatus according to the invention, providing a reaction mixture in a reaction space of the reactionware, and permitting the analytical device to analyse the reaction mixture in the reaction space of the reactionware, optionally permitting the analytical device to analyse the headspace of the reactionware, thereby obtaining a first profile of the reaction, the method further comprising the step of repeating the reaction in the same or a different reaction apparatus according to the invention, and obtaining at least a part of a second data profile of the repeat reaction, and optionally comparing that at least part with the data profile of the first data profile of the reaction.

Here, a part of a reaction profile refers to the collection of analytical data for only a part of the reaction course for which a data profile was obtained for the first reaction. Thus, a part of a reaction profile may refer to a part of the time course of the reaction analysed in the first reaction.

It is not necessary to collect a complete data profile for the second reaction, and a part of the data profile may be sufficient to determine the likely outcome of the second reaction. For example, analysing the initial reaction progression may allow the user to determine one or more of the identity, the yield, and the purity of the reaction product. Where these diverge from the results expected or required, the user may halt the second reaction at an early stage, without needing to take the reaction to completion and work-up, as noted above.

A full data profile for the second reaction may be obtained, if needed.

The methods of the invention also allow for the optimisation of a reaction by allowing a user to adapt a reaction such that the profile for that reaction, as recorded by an analytical device, can be brought into line with the profile for an optimised reaction.

A reaction performed in a reaction flask may be analysed as described above and the reaction progress, in the form of a developing reaction profile, may be compared with a reaction profile for an optimised reaction. This optimised reaction may be one that is associated with one or more advantageous reaction outcomes, such as yield and purity.

Where the developing reaction profile matches that of the optimised reaction profile the user can be confident that the reaction outcome will be the same, and the user need not make any adaptions to the reaction conditions to obtain a desired result.

However, the developing reaction profile may depart from the optimised reaction profile: thus the recorded data may indicate a difference in the developing chemical or physical properties of the reaction mixture. This difference may be associated with a sub-optimal reaction product. The user may abandon the reaction, or the user may make changes to the reaction conditions to alter the developing reaction profile so that it more closely matches that of the optimised reaction profile.

For example, where there is a change, such as a rise, in the reaction temperature during the reaction compared with the optimised reaction, the user may take steps to alter, such as cool, the reaction temperature, thereby to bring the developing reaction profile back into line with the optimised reaction profile following an earlier departure from that reaction profile.

The analysis for the recorded data from the reaction for a first parameter may be used as an indicator for a user to alter the reaction conditions to bring about a change in a second monitored reaction parameter, for example where that change may also bring about a change in the first parameter. For example, the recorded data for headspace pressure from an appropriately placed pressure sensor may provide an indicator to the user to change the reaction temperature, for example to lower or raise the reaction temperature by judicially applied cooling or heating. The reaction temperature may be monitored by an appropriately placed temperature sensor to ensure that the heating or cooling response to the recorded pressure values is appropriate. A change in the reaction temperature may bring about a change in the headspace pressure.

Thus, a method of the invention may include performing a reaction and obtaining a reaction profile for a first reaction parameter using a first sensor of the analytical device, comparing the reaction profile against a threshold value for that first parameter, and where the first parameter passes a threshold value, subsequently altering the reaction conditions thereby to bring about a change in the reaction profile for a second reaction parameter, which change in reaction profile is detectable by a second sensor of the analytical device.

Other Preferences

Each and every compatible combination of the embodiments described above is explicitly disclosed herein, as if each and every combination was individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figures described above.

Exemplary Embodiments of the Invention

Figure 3:
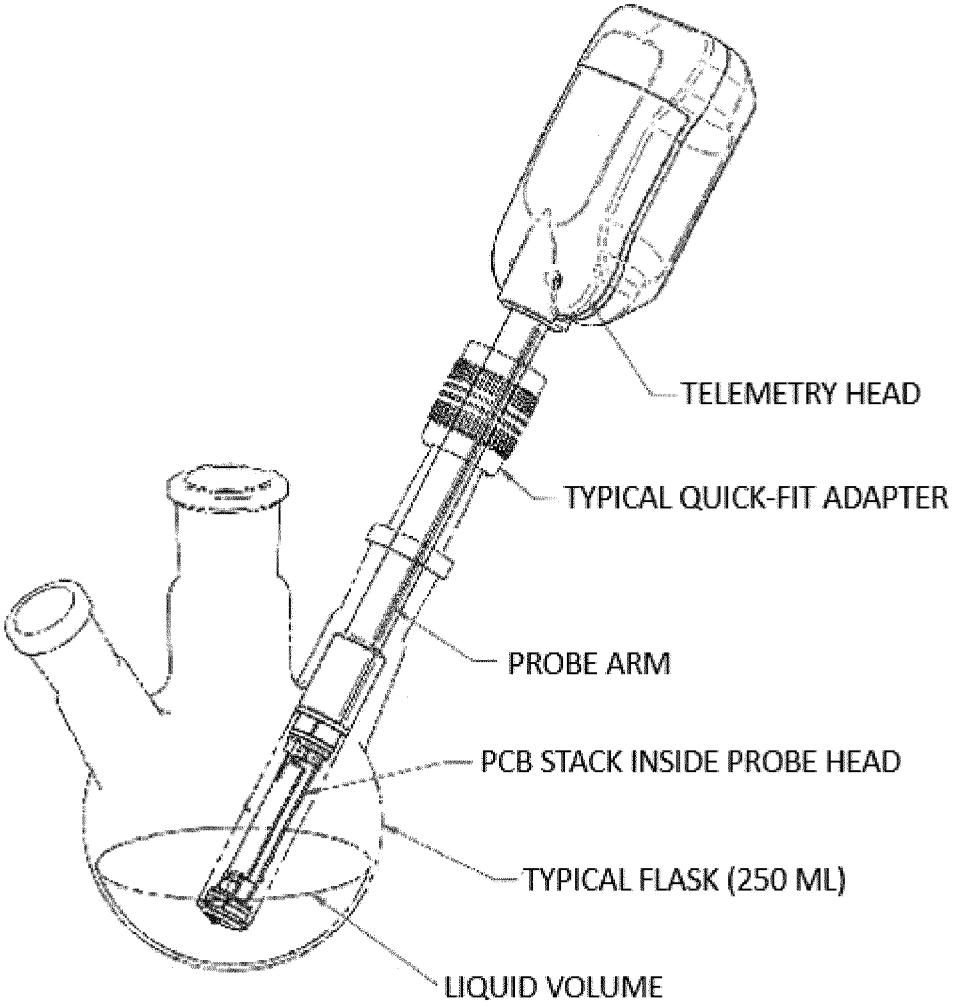
FIG. 3 is a perspective schematic of a reaction apparatus according to an embodiment of the seventh aspect of the invention, the apparatus comprising a reaction flask (such as shown in FIG. 1(*a*)) together with an analytical device according to an embodiment of the sixth aspect of the invention, where the analytical device is provided in a neck of the reaction flask. The analytical device is provided with a thermal barrier in the form an air chamber, which is placed between the sensor elements of a sensor and the electronic circuitry of the sensor.
Figure 4:
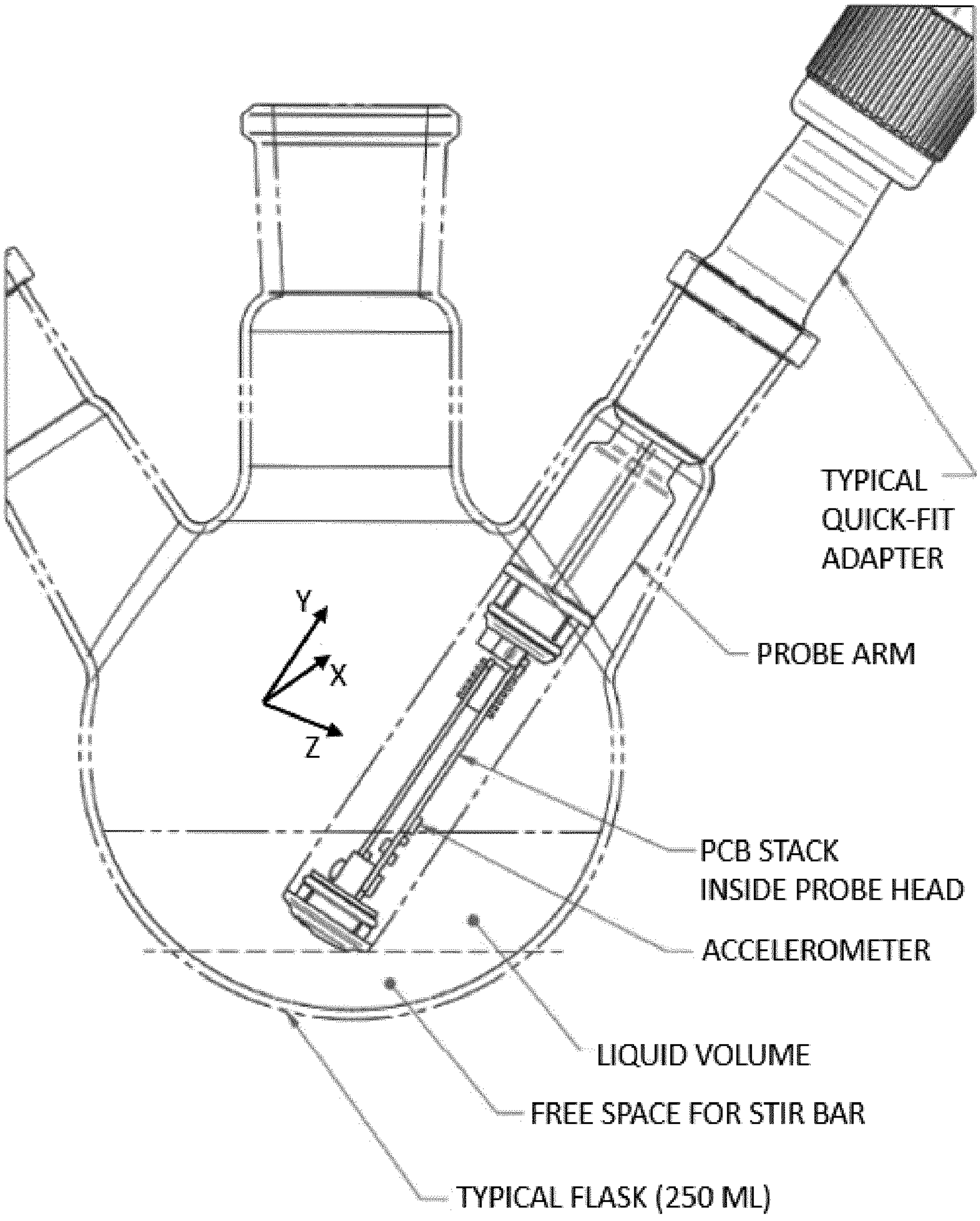
FIG. 4 is a schematic of the reaction apparatus and analytical device of FIG. 3, shown in elevation focussing on the reaction chamber and the sensor elements.
Figure 5:
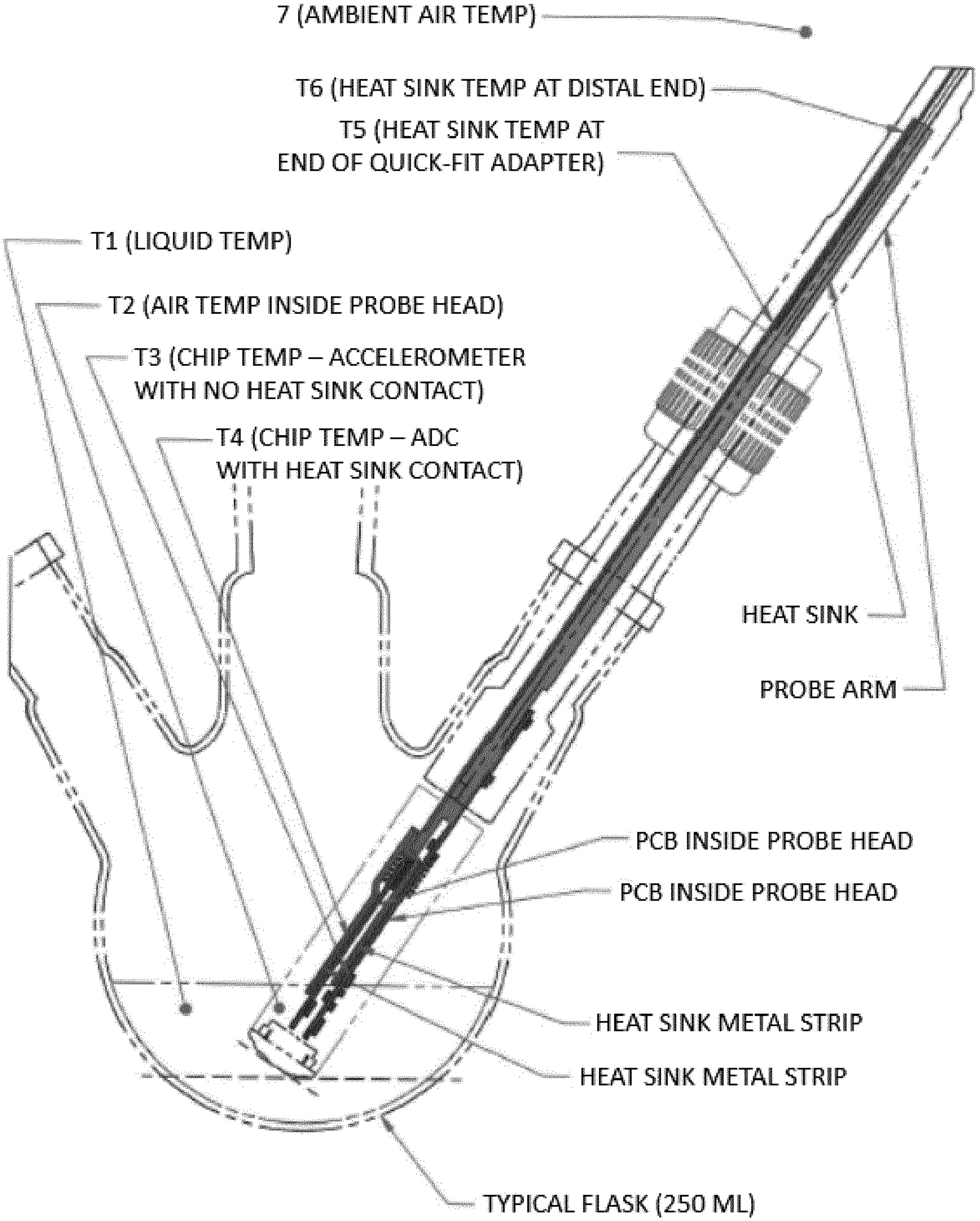
FIG. 5 is a schematic of a reaction apparatus according to an embodiment of the seventh aspect of the invention, the apparatus comprising a reaction flask (such as shown in FIG. 1(*a*)) together with an analytical device according to an embodiment of the sixth aspect of the invention, where the analytical device is provided in a neck of the reaction flask. The analytical device is provided with a thermal barrier in the form of an air chamber, which is placed between the sensor elements of a sensor and the electronic circuitry of the sensor. The thermal barrier is in thermal communication with a heat sink in the form of a thermally conductive metal strip.

An analytical device according to an embodiment of the first aspect of the invention is shown in FIGS. 1 (bottom) and 2. An analytical device according to an embodiment of the sixth aspect of the invention is shown in FIGS. 3, 4 and 5.

FIG. 1 (top) shows a standard 250 mL three-neck round-bottomed flask. The necks of the flask are female joints having a standard 24/29 tapering. The reaction flask is shown with a screw-thread quick-fit adapter held in the right-hand joint of the reaction flask. The screw-thread adapter has a male joint for cooperation with the female joint. The adapter is commonplace in the laboratory and is typically used to couple thermometers, bleed tubes, electrodes and the like with a joint. In the present case such an adapter may be used as part of the analytical device to couple the device to the reaction flask, as described in further detail below in relation to FIG. 1 (bottom).

The appropriate maximum fluid levels are shown, together with the expected level for a moving stirrer bar located in the round-bottomed flask. The expected maximum level of the stirrer bar together with the appropriate maximum fluid level defines a zone in the flask for location of reaction sensors for monitoring a reaction mixture held in the reaction flask (for example where the sensor is immersed in the reaction mixture).

FIG. 1 (bottom) shows an analytical apparatus comprising the reaction flask of FIG. 1 (top) together with an analytical device according to an embodiment of the invention. The analytical device has four sensors: two temperature sensors, a pH sensor and a pressure sensor. These sensors are provided in a housing, and the housing is mounted with the screw-thread adapter to secure the analytical device to the reaction flask.

The analytical device is additionally provided with a wireless communication device (not shown) for communicating data from the analytical device to a control device (not shown) and a power supply (not shown) for supplying power to the sensors and power to the wireless communication device.

The housing of the analytical device has an upper housing for holding the power supply and wireless communication device, and a lower housing which is an elongate probe for housing the sensor elements, which probe is connected to the upper housing at one end. The sensor element is in communication with the components of the upper housing. The lower housing is for accommodation in the reaction vessel and is the part of the housing that is mounted with the screw-thread adapter. The lower housing is suitable proportioned to allow for insertion through the female joint of the reaction flask and is suitable elongate to extend into the reaction space of the reaction flask when mounted with the reaction flask.

The temperature and pH sensors are each provided with exposed sensor elements for contact with a reaction mixture in the reaction space or for analysis of the reaction head space.

The analytical device in FIG. 1 (lower) is provided with two temperature sensors, a pH sensor and additionally a pressure sensor. The lower housing holds a temperature sensor and a pH sensor, with the sensor elements for the respective sensors provided at an end of the lower housing that is distal to the upper housing, thereby to locate the sensor elements in the reaction space of the reaction flask. The lower housing is provided with a further temperature sensor, with the sensor element provided in the middle section of the housing, thereby to locate the sensor element in the head space of the reaction flask.

The upper part of the housing holds the pressure sensors, and the sensor elements for this sensor are located at an outer surface of the upper housing.

Figure 2:
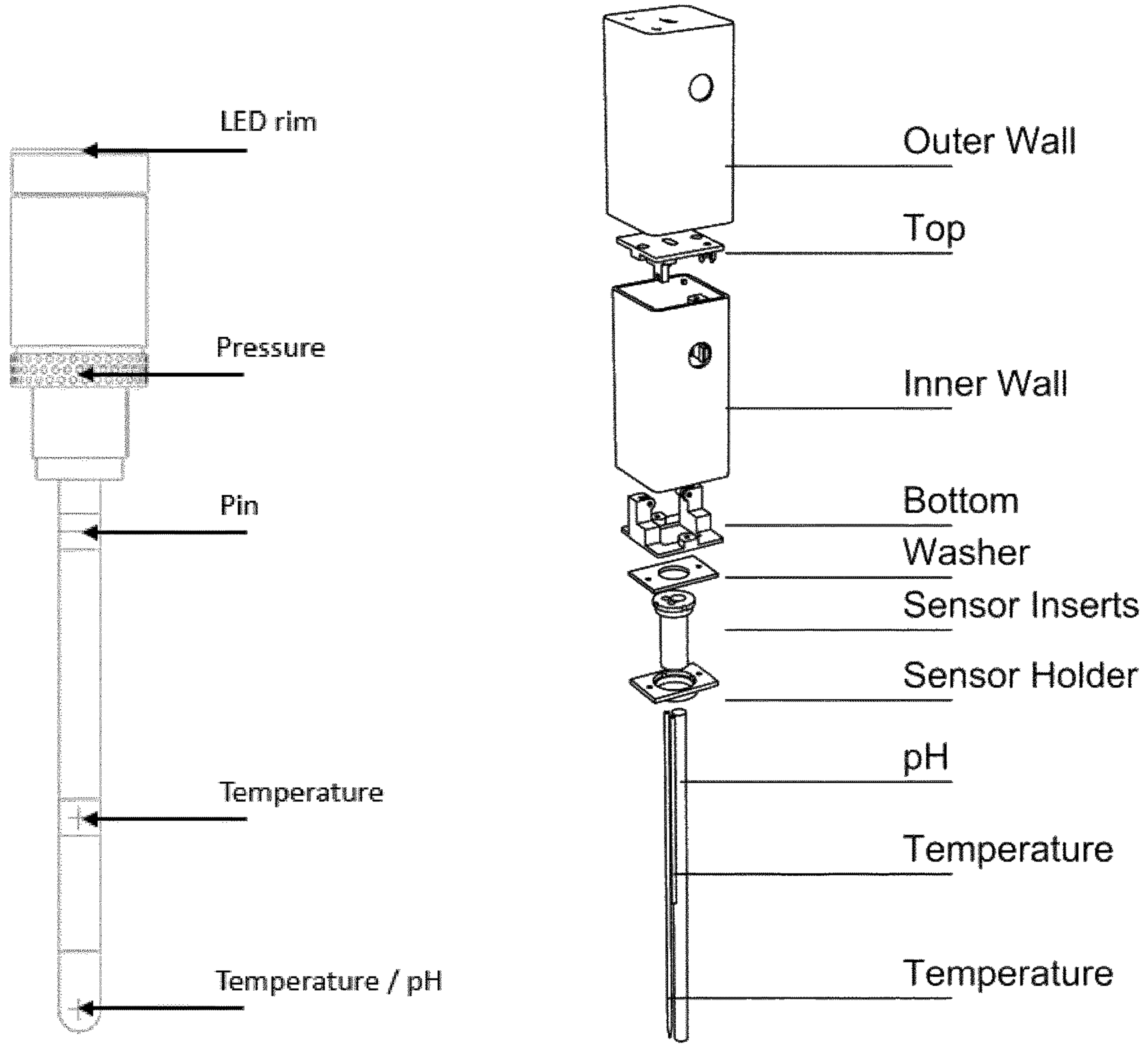
FIG. 2 is a schematic of (a) an analytical device according to an embodiment of the first aspect of the present invention; and (b) an exploded version of the analytical device of (a).

FIG. 2 shows a side view (left) and an exploded view (right) of an analytical device according to an embodiment of the invention. The device is the device shown together with the reaction flask in FIG. 1 (bottom).

The provision of the analytical device shown in FIGS. 1 (bottom) and 2 in a reaction flask provides an example embodiment of the reaction apparatus according to the second aspect of the invention.

The provision of the analytical device shown in FIGS. 3 and 4 in a reaction flask provides an example embodiment of the reaction apparatus according to the seventh aspect of the invention.

FIG. 3 shows a perspective view of an analytical device according to the sixth aspect of the present invention. The analytical device is provided together with a reaction flask, with the device held by and extending into the reaction flask. The analytical device is provided with a sensor comprising a sensor element part and a further part which comprises electronic circuitry in the form of a printed circuit board. The sensor element is provided at an outer surface of the device for location within the reaction space of the reaction flask.

The portion of the analytical device that is located within the reaction flask may be constructed from a thermally insulating material, such as glass.

The analytical device comprises a thermal barrier between a sensor element of the sensor and a further part of the sensor. Here, the thermal barrier is a gaseous barrier, and more specifically an air barrier. The air may be provided at atmospheric pressure in a sealed chamber, or below or above atmospheric pressure, such as measured at 20° C.

The analytical device of FIG. 3 is shown in closer detail in FIG. 4, with magnification of the portion of the analytical device that is located within the reaction space of the reaction flask.

Each of the devices shown in FIGS. 3 and 4 may be provided with a plurality of sensors, such as temperature and pH sensors, amongst others. Preferably, the device is provided with three of more sensors, and these may include sensors selected from the group consisting of pH sensor, acoustic sensor, IR sensor, UV-VIS sensor, pressure sensor, temperature sensor, image sensor, conductivity sensor and electrochemical sensor.

A further analytical device is shown in FIG. 5, and this device is provided together with a reaction flask, with the device held by and extending into the reaction flask. Like the analytical device of FIGS. 3 and 4, the analytical device of FIG. 5 is provided with a thermal barrier in the form of a gaseous barrier.

Additionally, the device of FIG. 5 is provided with a thermal sink in thermal connection with the gaseous thermal barrier. The thermal sink is a metallic strip which extends along the length of the analytical device from the part of the device that is located in the reaction space of the reaction flask to the part of device that is located outside the reaction flask. In this arrangement the thermal sink is capable of transferring heat to and from the ambient surroundings, thereby to limit or prevent changes in the temperature of the electronic circuitry, such as the printed circuit board.

A greater portion of the thermal sink is located outside of the reaction flask (not shown). This type of arrangement ensures adequate dissipation of heat from the thermal sink, for example where the sink is required to transfer heat from the electronic circuitry when the sensor elements are exposed to elevated temperatures in the reaction vessel. Similarly, the heat sink may be used to transfer heat from the ambient environment to the electronic circuitry when the sensor elements are exposed to reduced temperatures in the reaction vessel.

The analytical device of FIG. 5 may be provided with a single sensor, although this is not preferred. Thus, the analytical device may be provided with a plurality of sensors, such as three or more sensors. Preferred sensors for use are those selected from group consisting of pH sensor, conductivity sensor, image sensor, such as still or video imagery, IR sensor, UV-vis sensor, including a colour sensor or a luminosity sensor, and acoustic sensor.

The sensors may be provide for analysis of the reaction mixture in the reaction flask, the reaction head space, and/or the environment about the reactionware, such as the atmosphere surrounding the reactionware.

REFERENCES

A number of publications are cited above in order to more fully describe and disclose the invention and the state of the art to which the invention pertains. Full citations for these references are provided below. The entirety of each of these references is incorporated herein.

Alaoui et al. *Journal of Minerals, Metals and Materials* 2015, 67, 1068
CN 201903537
CN 203678359
CN 204544169
CN 206056822
CN 206065562
WO 2019/105965 PCT/EP2018/082770
JP H10-187251
U.S. Pat. No. 5,380,485
WO 2010/135377

The invention claimed is:

1. A reaction apparatus comprising a reactionware and an analytical device, wherein the analytical device comprises a housing and a plurality of reaction sensors disposed within the housing, wherein the housing of the analytical device is configured for placement of the plurality of sensors in a reaction space of the reactionware, wherein the housing of the analytical device comprises an upper housing and a lower housing, the plurality of reaction sensors being disposed at least within the lower housing, wherein the reactionware is a reaction flask having one or more necks, and the lower housing of the analytical device is held in a neck of the reaction flask, and wherein the lower housing of the analytical device is proportioned to allow for insertion through said neck of the reaction flask, and is suitably elongate to extend into the reaction space of the reaction flask such that the reaction sensors are placed in the reaction space of the reaction flask.

2. The reaction apparatus according to claim 1, wherein each of the sensors is selected from the group consisting of pH sensor, acoustic sensor, IR sensor, UV-VIS sensor, pressure sensor, temperature sensor, movement sensor, image sensor, conductivity sensor, electrochemical sensor, gravity sensor, accelerometer, and phase boundary sensor.

3. The reaction apparatus according to claim 2, wherein each of the sensors is selected from the group consisting of pH sensor, acoustic sensor, IR sensor, UV-VIS sensor, pressure sensor, temperature sensor, image sensor, conductivity sensor and electrochemical sensor.

4. The reaction apparatus according to claim 1, wherein the analytical device comprises three, four, five, six, seven or eight or more reaction sensors.

5. The reaction apparatus according to claim 1, wherein the sensors are not the same.

6. The reaction apparatus according to claim 1, wherein the reaction flask;

(i) is a round-bottomed flask; and or (ii) has two or three necks; and/or (iii) has a volume in a range 50 to 1,000 mL, or a volume of 100, 250 or 500 mL.

7. The reaction apparatus according to claim 1, wherein the neck holding the lower housing of the analytical device is a female tapered joint, and the lower housing of the analytical device is adapted to be held in the joint.

8. The reaction apparatus according to claim 1, further comprising a stirrer bar, wherein the stirrer bar is provided in the reaction flask, and the sensors are located above a level of the stirrer bar.

9. The reaction apparatus according to claim 8, wherein the stirrer bar is provided with a sensor, and the sensor of the stirrer bar is in communication with the analytical device, and the stirrer bar is optionally controllable by the analytical device, and/or the stirrer bar is in communication with a control device, and the stirrer bar is optionally controllable by the control device.

10. The reaction apparatus according to claim 1, wherein the analytical device;

(i) further comprises a sampler for removing a sample from the reaction space of the reaction flask; and/or (ii) is provided with a memory device for storing analytical information.

11. The reaction apparatus according to claim 1, further comprising a control device in communication with the analytical device, wherein the control device is optionally provided with a memory device for storing analytical information.

12. A network comprising a plurality of reaction apparatuses according to claim 1 and a control device, wherein the plurality of reaction apparatuses are in communication with the control device of the network.

13. The network according to claim 12, wherein a first reaction apparatus of the plurality of reaction apparatuses is located in a separate location from a second reaction apparatus of the plurality of reaction apparatuses.

14. An analytical device for a reactionware, the analytical device comprising:

a housing; and a plurality of reaction sensors disposed within the housing, wherein the housing of the analytical device is configured for placement of the plurality of sensors in a reaction space of the reactionware, wherein the housing of the analytical device comprises an upper housing and a lower housing, the plurality of reaction sensors being disposed at least within the lower housing, wherein the reactionware is a reaction flask having one or more necks, and the lower housing of the analytical device is for holding in a neck of the reaction flask, and wherein the lower housing is proportioned to allow for insertion through said neck of the reaction flask, and is suitably elongate to extend into the reaction space of the reaction flask when the lower housing is held in the neck of the reaction flask such that the reaction sensors are placed in the reaction space of the reaction flask.

15. An analytical device for a reactionware, the analytical device comprising:

a housing comprising an upper housing and a lower housing; and a plurality of sensors disposed at least within the lower housing, wherein at least one sensor of the plurality of sensors has a sensor element part and a further part, which further part is electronic circuitry for the at least one sensor and is in communication with the sensor element part, wherein a thermal barrier is provided between the sensor element part and the further part, wherein the reactionware is a reaction flask having one or more necks, and the lower housing of the analytical device is for holding in a neck of the reaction flask, and wherein the lower housing is proportioned to allow for insertion through said neck of the reaction flask, and is suitably elongate to extend into a reaction space of the reaction flask when the lower housing is held in the neck of the reaction flask such that the plurality of sensors are placed in the reaction space of the reaction flask.

16. The analytical device of claim 15, wherein;

(i) the electronic circuitry is a printed circuit board and/or;

(ii) the thermal barrier is provided by a gas and/or (iii) the analytical device further comprises a thermal sink in thermal communication with the thermal barrier or the sensor element part.

17. The analytical device of claim 16, wherein the thermal sink is a metallic thermal sink.

18. An analytical device according to claim 15, provided together with a reactionware, wherein the housing of the analytical device is configured for placement of the at least one sensor in the reaction space of the reactionware or a headspace of the reactionware, and the reactionware is a reaction flask having one or more necks, and the lower housing of the analytical device is held in a neck of the reaction flask.

19. The analytical device according to claim 15, wherein the analytical device comprises a plurality of reaction sensors, where at least one sensor has a sensor element part and a further part, which further part is electronic circuitry for the at least one sensor and is in communication with the sensor element part, wherein a thermal barrier is provided between the sensor element part and the further part, and the housing of the analytical device is configured for placement of the plurality of sensors in the reaction space of the reactionware, and the reactionware is a reaction flask having one or more necks, and the lower housing of the analytical device is held in a neck of the reaction flask.

* * * * *